Figure 1:
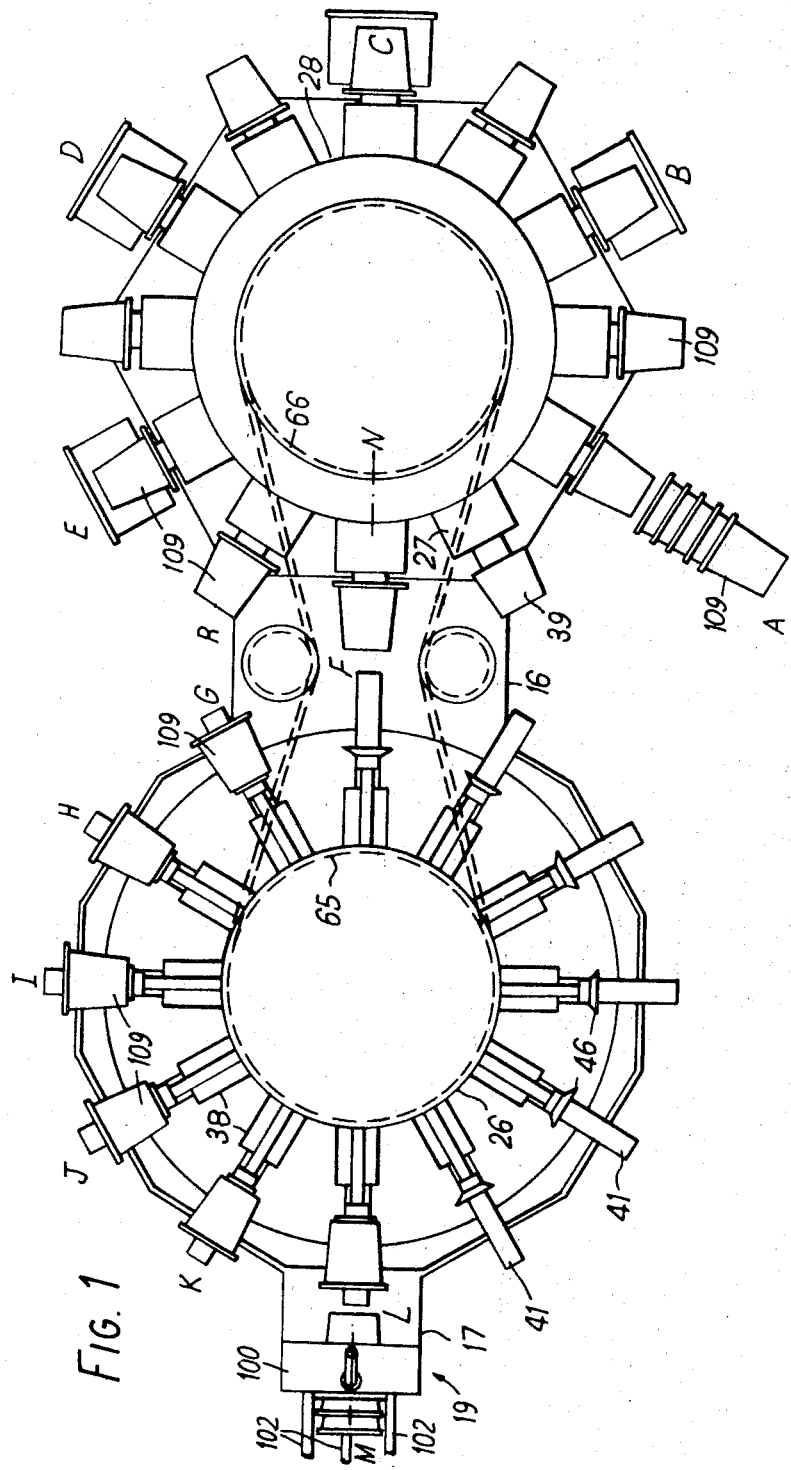

United States Patent [19]

Jackson

[11] 3,834,522

[45] Sept. 10, 1974

[54] TAKE OFF AND STACKER FOR CONTAINER PRINTING MACHINE

[75] Inventor: John Maxwell Jackson, Potters Bar, England

[73] Assignee: Chromax Limited, Watford, Hertfordshire, England

[22] Filed: Feb. 16, 1973

[21] Appl. No.: 332,799

[30] Foreign Application Priority Data
Feb. 17, 1972  Great Britain ..................... 7419/72

[52] U.S. Cl. ................ 198/210, 101/38 A, 198/25, 214/1 BH
[51] Int. Cl. ....................... B65g 47/91, B65g 47/52
[58] Field of Search.. 214/1 BH, 1 BV, 1 BC, 1 BD; 198/25, 24, 210; 101/38–40; 74/33

[56] References Cited
UNITED STATES PATENTS

| | | | |
|---|---|---|---|
| 1,378,029 | 5/1921 | Hatmaker ............................. | 74/33 |
| 2,878,620 | 3/1959 | Calehuff et al. ..................... | 198/22 |
| 3,016,153 | 1/1962 | Porterfield ......................... | 214/1 BV |
| 3,208,602 | 9/1965 | Laidig et al ........................ | 214/1 BC |
| 3,250,213 | 5/1966 | Brigham et al. ..................... | 101/40 |
| 3,261,281 | 7/1966 | Hartmeister ........................ | 101/40 X |
| 3,496,863 | 2/1970 | Cracho et al. ...................... | 101/40 |
| 3,586,175 | 6/1971 | Gauld .............................. | 214/1 BD |
| 3,685,441 | 8/1972 | Aebersold et al ................... | 101/38 A |

Primary Examiner—Clifford D. Crowder
Attorney, Agent, or Firm—Browdy and Neimark

[57] ABSTRACT

A transfer machine which grips containers printed at high speed with volatile ink, holds each container for a period of time sufficient to allow the ink to dry, and then feeds the container into a stacking device. The transfer machine comprises a turret and a plurality of carriages mounted on and spaced around the turret, each carriage being movable radially on the turret and fitted with a suction head for gripping a container. The transfer machine is driven in synchronism with the printing machine so that the turret is indexed to register each carriage in turn with the unloading station of the printing machine and subsequently with the stacking device. Slide blocks on the base of the transfer machine engage the carriages in register with the unloading station and the stacking device at each index position of the turret, and cam mechanism reciprocates the slide blocks so as to move one carriage radially outwards to grip the container at the unloading station and return to the radially inner position carrying the container, and to move the other carriage radially outwards to feed its container into the stacking device. The time delay in transferring each container from the printing machine to the stacking device depends on the number of times the turret is indexed during this transfer.

7 Claims, 6 Drawing Figures

TAKE OFF AND STACKER FOR CONTAINER PRINTING MACHINE

This invention relates to the transfer of articles between two stations in a continuous production line for printing, processing or otherwise treating the articles, and has for its object to provide a method and machine for introducing a time delay in the transfer between two stations while maintaining mechanical control of the articles.

The invention is particularly applicable to the handling of frusto-conical or cylindrical containers which have been printed in different colours at high speed in a multi-cylinder printing machine. Hitherto it has been normal practice to transfer the printed containers directly to a conveyor for passage through a drying zone and an inspection zone, and then transfer the containers from the conveyor to a stacking device. Such a system has however the disadvantage that there is no direct mechanical control of the containers while on the conveyor, and any small relative movement between successive containers arising from the transfer onto the conveyor and then to the stacking device will result in the printed images on the containers in a stack being out of alignment. This is particularly the case with containers of a proportion in which the diameter exceeds the depth since such containers are difficult to restack from a conveyor. A stack in which the printed matter on the containers is out of alignment cannot of course be used with filling apparatus which stamps an indication of the contents on the container at the time of filling, since the stamp might be obscured if it overlay the printed matter.

According to the present invention there is provided a machine for transferring articles between two stations, comprising a turret rotatably mounted on a frame, a plurality of carriages mounted on and spaced around the turret, each carriage being movable relative to the rotational axis of the turret between radially inner and radially outer positions, drive means operable to turn the turret intermittently into a plurality of index positions in each revolution thereof to bring each of said carriages in succession into register with a loading station and subsequently into register with an unloading station at different index positions of the turret, means operable to move each carriage from the inner position to the outer position and back to the inner position when the carriage is in register with the loading station and again when in register with the unloading station, and gripper means on each carriage operable to grip an article at the loading station when the carriage is in its outer position at the loading station, and to release the article at the unloading station when the carriage is in its outer position at the unloading station.

The transfer machine may be used in any production line in which it is desired to introduce a time delay in the flow of articles. For example, the transfer machine may be used to handle containers printed at high speed by a printing machine using highly volatile inks which dry in a short time, for example 1 second. The time delay caused by indexing the turret several times during travel of each container between the two stations enables the ink to dry and the container to be inspected. A stacking device can conveniently be provided at the second station to receive the containers. Since the machine never loses mechanical control of the containers during travel between the two stations, the printed images in any stack formed at the second station will be in alignment.

The transfer machine of the invention is particularly suitable for use with a multi-cylinder printing machine as described and illustrated in U.S. Pat. No. 3,645,201 which comprises a turret provided with mandrels spaced around the turret and adapted to support the containers to be printed, and drive means operable to turn the turret intermittently to register the mandrels in succession with the printing cylinders. The transfer machine must then of course be driven in synchronism with the printing machine, and the turrets of the two machines can conveniently be connected together by a sprocket and chain mechanism or other drive means arranged so that angular movement of the turret of the printing machine into its index positions causes simultaneous angular movement of the turret of the transfer machine into its index positions, and the means for moving the carriages between their inner and outer positions driven from the main drive shaft of the machine. The number of carriages, and hence the number of index positions of the turret of the transfer machine, will be determined by the time delay desired, and the gear ratio of the drive means for the two turrets must of course be equal to the ratio of the number of mandrels to the number of carriages, so that a carriage of the transfer machine is aligned with a mandrel of the printing machine at each index position of the turrets.

Figure 2:
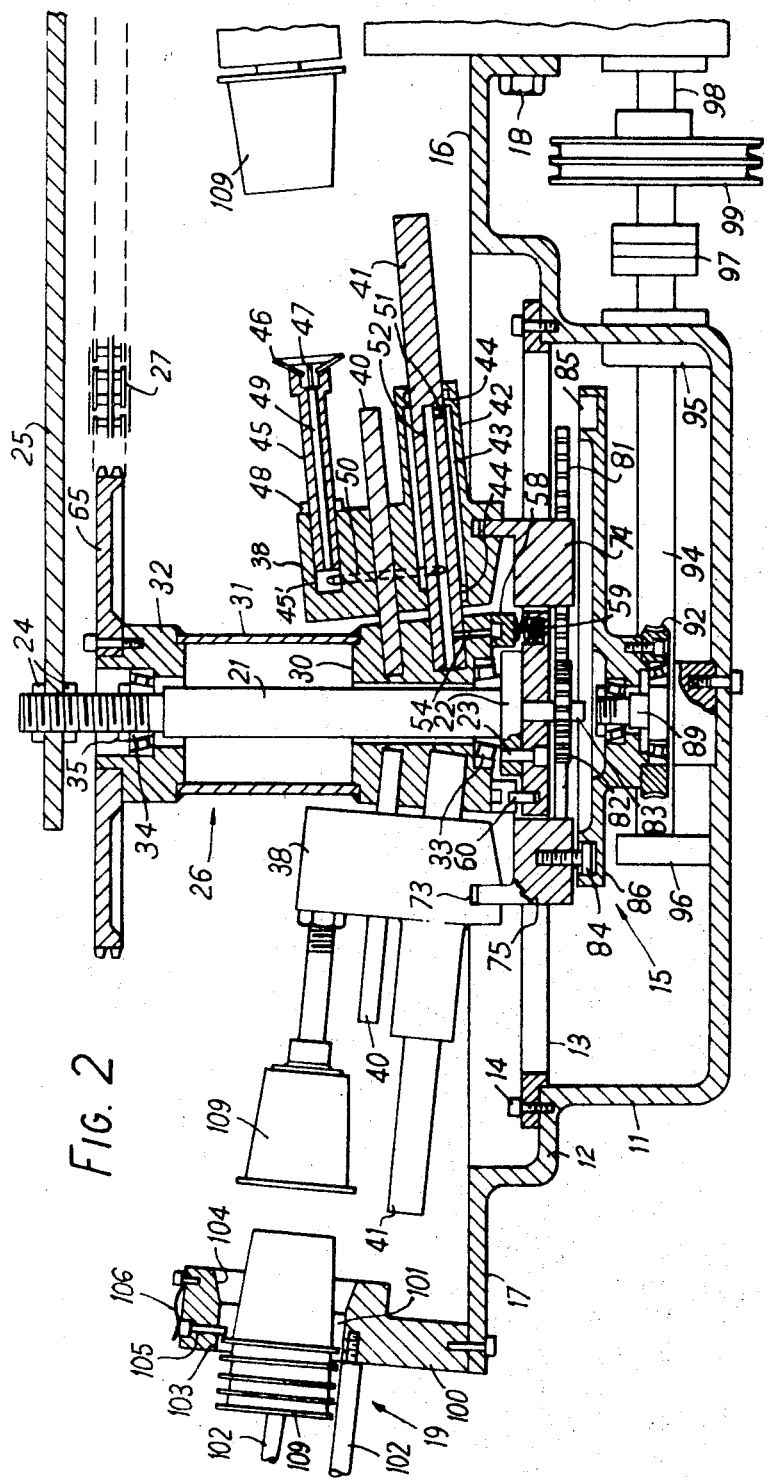
Figure 3:
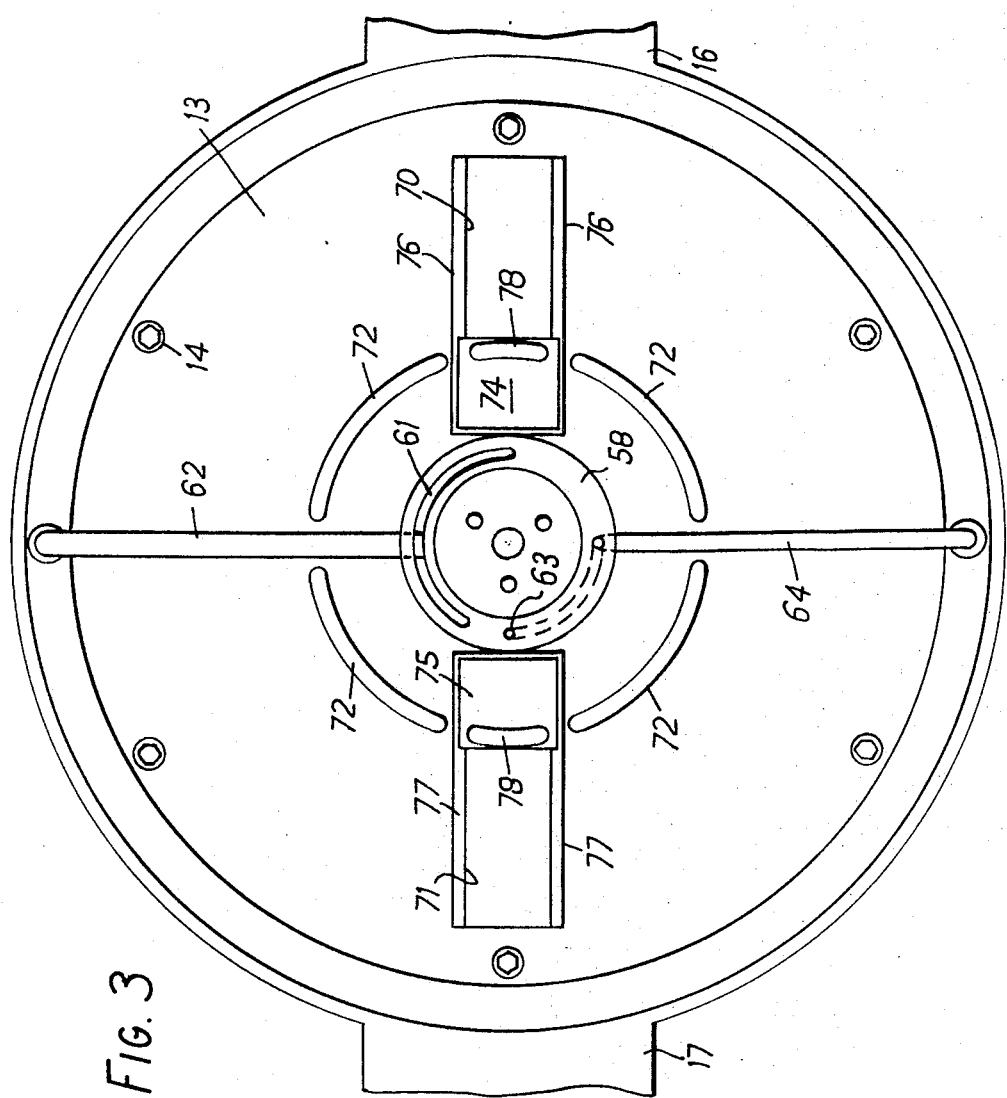
Figure 4:
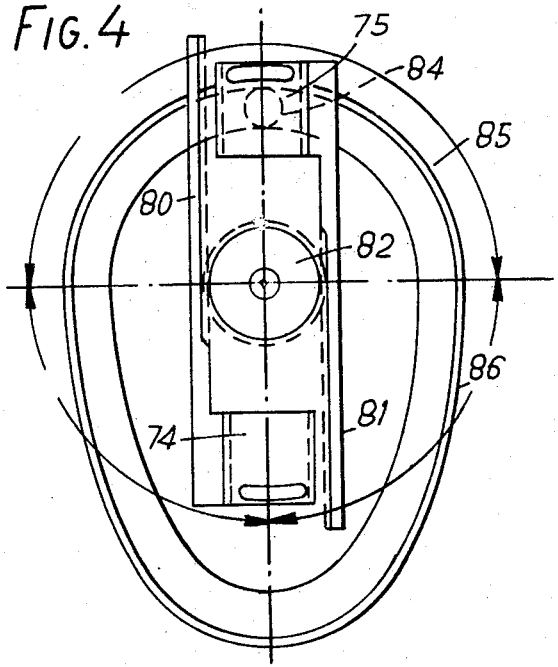
Figure 5:
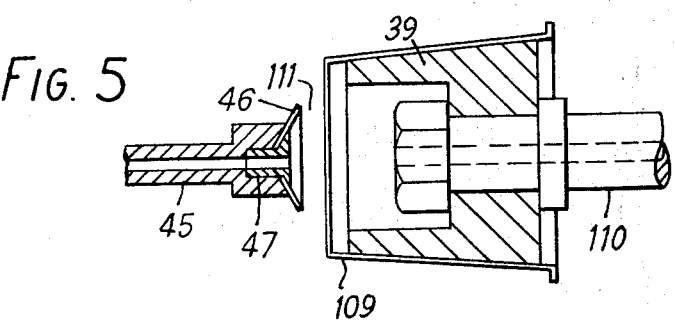
Figure 6:
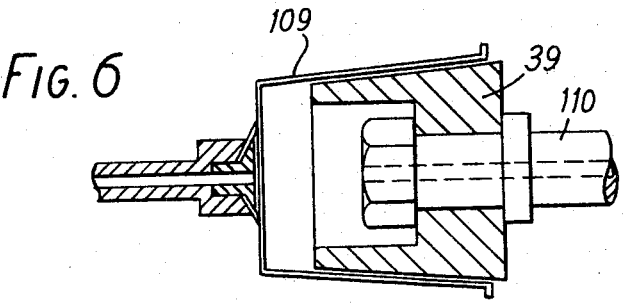

A transfer machine according to the invention and adapted to remove frusto-conical containers from the printing machine of the above mentioned patent and subsequently stack the containers after a time delay to enable the print on the containers to dry, will now be described, by way of example, with reference to the accompanying drawings, in which:

FIG. 1 is a plan view of the transfer machine coupled to the printing machine,

FIG. 2 is a part-sectional elevation view of the transfer machine taken along the centre line M.N. in FIG. 1, but on a larger scale than FIG. 1, FIG. 3 is a plan view of part of the transfer machine with the turret removed, FIG. 4 is a diagrammatic view of the slide actuating mechanism, FIG. 5 is a part sectional view of a mandrel of the printing machine supporting a frusto-conical container, and a suction head of the transfer machine in a position to receive the container, FIG. 6 is a view similar to FIG. 5 but showing the container supported by the suction head after it has been forced thereagainst by a blast of compressed air from the mandrel.

Referring to FIG. 2, the transfer machine comprises a frame consisting of a box-like base 11 having a polygonal side wall formed with a step 12, and a circular cover plate 13 mounted on the step and secured thereto by screws 14, the cover plate co-operating with the base to form a chamber for a slide actuating mechanism 15. The top of the base 11 is formed at opposite sides thereof with two bracket arms 16, 17, the arm 16 being secured by bolts 18 to the frame of the printing machine and thereby supporting the weight of the transfer machine, and the arm 17 supporting a container stacker device 19. A centre column 21 has a base 22 secured by screws 23 to the cover plate, the top of the column being screw threaded and provided with nuts 24 which clamp the column to a re-inforcing arm 25 secured to the printing machine (the arm 25 is not shown in FIG. 1). A turret 26 is rotatably mounted on the column 21, the turret being drivably connected by a chain 27 to the turret 28 of the printing machine.

The turret 26 comprises a base block 30, an upright spacer tube 31 secured on the block and a head 32 secured on the upper end of the tube, the base block and head having bores in alignment with the axis of the tube for reception of the column 21. The turret is mounted on the column by thrust bearings 33, 34 abutting against shoulders in the bores in the block 30 and head 32 respectively, the bearing 33 being mounted on the base 22 of the column and the bearings being held against the shoulders by a lock nut 35 screwed on the top of the column. The turret 26 is provided with 12 carriages 38 spaced at equal angular intervals around the turret and corresponding to the 12 mandrels 39 (FIG. 1) of the printing machine, each carriage being mounted as a sliding fit on a separate pair of substantially radial guide rods 40, 41. The guide rods are secured at their inner ends in bores in the base 30 of the turret and are arranged with the rod 40 located above the rod 41 and the two rods inclined upwards relative to the horizontal at the same angle at which the mandrels are inclined downwards. Each carriage is substantially L shaped with the bore 42 for the guide rod 41 extending along the lower limb of the carriage so as to provide a substantially long bore. Only the ends of the bore 42 are a close fit on the guide rod 41, the centre portion of the bore being enlarged to form an annular chamber 43, and the wall of the bore at each end thereof is fitted with a rubber seal 44 to prevent ingress of air into the chamber 43 along the rod 41, for a purpose described hereinafter.

Each carriage 38 is fitted with a suction head comprising a stem 45 and a rubber suction cup 46 mounted on the outer end of the stem by means of an attachment bush 47, the inner end of the stem being a sliding fit in a bore 45' in the carriage. The stem is parallel to the guide rods 40, 41, and is secured at any desired position in its bore by a lock nut 48. The attachment bush and the stem are drilled to form a duct 49 which communicates through a further duct 50 in the carriage with the annular chamber 43 surrounding guide rod 41. The annular chamber 43 communicates through a port 51 with a bore 52 in the guide rod 41, the port 51 being so positioned that it is in continuous communication with the annular chamber 43 throughout the range of movement of the carriage on the guide rods 40, 41. The inner end of the bore 52 communicates through a further port in the guide rod with a duct 54 which opens through the bottom surface of the base of the turret.

A distributor ring 58 is urged against the bottom surface of the turret by springs 59 and restrained from rotating by dowel pins 60 secured to the cover plate 13 and engaged as a sliding fit in bores in the ring 58. The upper surface of the ring 58 is formed with an arcuate slot 61 (FIG. 3) which communicates with a vacuum pipe 62, and with a port 63 which communicates with a further pipe 64 connected to an air release valve (not shown), the slot 61 and port 63 being at the same radial distance from the turret axis as duct 54 so as to register therewith in turn upon rotation of the turret.

The drive chain 27 is engaged with a sprocket 65 secured on the head of the turret 26 and with a sprocket 66 (FIG. 1) secured on the head of the turret 28 of the printing machine. The sprockets 65, 66 are the same diameter so that the two turrets rotate in synchronism.

As shown in FIG. 3, the cover plate 13 is formed with two rectangular apertures 70, 71 which lie along the centre line passing through the axes of the two turrets 26, 28, and the top of the cover plate is formed with arcuate ribs 72 lying on a circle concentric with the turret axis. The ribs are adapted to engage in arcuate tracks 73 in the undersides of the carriages 38.

The actuating mechanism for the carriages comprises two slide blocks 74, 75 which are a close sliding fit in the apertures 70, 71 respectively. The upper portions of the slide blocks have a greater width than the remainder thereof so as to form shoulders (not shown) which project over slide ways 76, 77 along the side edges of the apertures, the weight of the blocks being supported on the slideways. The top of each slide block is formed with an arcuate tongue 78 which, when the blocks are in their radially innermost position as shown in FIG. 3, lies on the circle passing through the arcuate ribs 72. Toothed racks 80, 81 (FIG. 4) are secured to the lower ends of slide blocks 74, 75 respectively, the two racks meshing with opposite sides of a pinion 82 rotatably mounted on a pin 83 projecting from the underside of the cover plate. Movement of one of the slide blocks 74, 75 along its slideway thus causes rotation of the pinion which in turn causes a corresponding movement of the other slide block along its slideway in the opposite direction. The slide block 75 carries a cam follower 84 engaging in a cam track 85 provided in the top surface of a cam 86 rotatably mounted by taper roller bearings on an upright stub shaft 89 secured by screws to the base 11. The cam 86 is fitted with a worm wheel 92 which meshes with a worm secured on a shaft 94 rotatably mounted in bearings 95, 96. The shaft 94 is connected by a flexible coupling 97 to the main drive shaft 98 of the printing machine. Rotation of the shaft 98 thus rotates the cam and thereby causes the two slide blocks 74, 75 to move radially outwards and inwards relative to the axis of the turret 26 in precisely timed relationship to the cycling of the printing machine. The worm gearing is arranged to rotate the cam through one revolution in each cycle of the printing machine and, as shown in FIG. 4, the cam track 85 is arranged so that for 180° of rotation of the cam the slide blocks are held in the radially innermost position, for the next 90° of rotation of the cam they are moved to the outermost position and for the next 90° or rotation they are moved back to the radially innermost position.

The printing machine and the transfer machine are driven as a unit by a motor (not shown) drivably connected to a pully 99 on shaft 98.

The stacker device 19 comprises a ring shaped body 100, the axis of the central bore 101 of which lies in the vertical plane through the axes of the two turrets 26, 28 and is inclined downwards relative to the horizontal at the same angle as the guide rods 40, 41, and three bars 102 secured to the body 100 and co-operating to form a trough which is a continuation of the central bore 101 and adapted to support containers forced through the bore. The central bore 101 has a cylindrical section 103 of a diameter to receive as a close sliding fit the containers to be stacked, and a flared mouth 104 for guiding the containers into the cylindrical section 103. This section 103 is fitted with several detents 105 urged inwards by springs 106, the detents 105 having their inner ends chamfered in a known manner so that indents 105 are forced outwards to permit passage of each container through the bore of the device when the container is forced against the chamfered ends of the detents. The detents are spring-urged inwardly with sufficient force to prevent the containers from sliding back through the bore. Frusto-conical containers fed in succession through the bore of the device thus emerge as a stack which is supported on the bars 102.

In the operation of the printing machine, the turret 28 is turned intermittently by Geneva mechanism to index each mandrel 39 in succession at each of the twelve stations spaced around the turret. A frusto-conical container 109 is fitted on each mandrel indexed at station A, the container printed with quick drying volatile inks at stations B, C, D, E, and the containers picked off their mandrels at station F by the transfer machine. The stations intermediate the printing stations B, C, D, E are drying stations which enable the volatile ink applied at one station to dry before ink is applied at the next printing station. During their passage through stations A - E the containers are held on their mandrels 39 by vacuum applied to the inside of the containers through a duct 110 (FIG. 5) in the mandrel. At station R the vacuum is released, and at station F the duct 110 is connected to a source of compressed air which ejects the container off the mandrel. It will be appreciated that each mandrel between stations A – F supports a container and the operations at these stations are carried out simultaneously during one cycle of the machine. Reference may be made to U.S. Pat. No. 3,645,201 for details of the construction of the printing machine.

The turret 26 of the transfer machine, which is driven in synchronism with the turret 28 of the printing machine by chain 27, is thus also turned intermittently into 12 index positions in each revolution. During movement of the turret 26 the arcuate ribs 72 on the cover plate 13 engage in the arcuate guides 73 on the underside of the carriages and prevent radial movement of the carriages due to centrifugal force. The turret 26 is arranged so that at each index position one slide carriage 38 is facing the mandrel of the printing machine indexed at station F and the diametrically opposite carriage 38 is facing the stacker device 19, and these two carriages have their arcuate guides 73 engaged by the tongues 78 on the slide blocks 74, 75. At each index position, the drive shaft 98 turns the cam 86 through one complete revolution and thereby moves the slide blocks 74, 75 from their radially innermost positions to the outermost position and back. The two carriages 38 which are engaged with the slide blocks are thus also moved on their guide rods 40, 41 radially outwards one towards the mandrel at station F and the other towards the stacker device 19, and then returned to their radially inner positions.

When the carriage indexed at station F is moved into its outermost position, a valve actuated in sequence with operation of the printing machine supplies compressed air to the duct 110 in the mandrel at station F and forces the container off the mandrel and onto the suction cup of the carriage. The carriage indexed at station F has its air duct 54 in register with the slot 61 (FIG. 3) in the distributor ring 58 and the vacuum in pipe 62 is thus applied to the air ducts in the carriage and hence to the suction cup. The base of the container adheres to the cup 46 immediately it contacts it due to the suction therein. The range of movement of the carriage 38 by the slide actuating mechanism is such that there is a gap 111 between the suction cup and the container on the mandrel, prior to ejection of the container, to ensure that the container cannot be in contact simultaneously with the mandrel which may be rotating and the suction cup which does not rotate. FIG. 6 shows the container held by the suction cup after it has been ejected from the mandrel. The carriage 38 carrying the container is then moved to its inner position by the slide actuating mechanism and, as the machine continues to cycle, the carriage carries the container through inspection and final drying stations G, H, I, J and K to position L. During movement of the carriage through stations G – K the air duct 54 remains in register with the slot 61 in the distributor ring to maintain the vacuum at the suction cup. When the carriage is moved into index position L, the duct registers with the port 63 in the distributor ring. The suction cup is then no longer connected to the source of vacuum, but the residual vacuum in the ducts in the carriage is sufficient to support the container on the suction cup. The carriage at station L again moves outwards under the control of the slide actuating mechanism and forces the container into the stacker device 19. The air release valve (not shown), which is connected to the suction cup through port 63 and pipe 64, is then operated by trip mechanism (not shown) operable by cam 86 upon each revolution thereof about shaft 89 to release the vacuum and thereby release the container from the carriage.

In the embodiment illustrated in the drawings the number of carriages on the transfer machine is equal to the number of mandrels so that the two turrets must necessarily be turned through the same angle between index positions. The number of carriages may however be greater or less than the number of mandrels, but in this event the drive means for the two turrets must have a gear ratio equal to the ratio of the number of mandrels to the number of carriages.

The transfer machine can of course also be used for handling cylindrical or any other shape of container which can be held by the suction cups on the carriages. When the transfer machine is being used for handling cylindrical containers a different type of receiving mechanism is required at station L. The containers could for example be deposited on a belt conveyor when the carriage at station L reaches its outward extremity of movement, or alternatively the containers could be fed on to a peg conveyor synchronized for movement with the printing machine mechanism. Such conveyors are well known by those versed in the art of printing cylindrical plastic or metal containers. When cylindrical containers are handled the guide rods 40, 41 are preferably horizontal instead of inclined which is the most convenient arrangement when handling frusto-conical containers.

I claim:

1. A machine for transferring articles between two stations comprising:
   a frame;
   a turret mounted on said frame for rotation about an axis thereof;
   a plurality of carriages mounted on and spaced around the turret;

turret drive means operable to turn the turret intermittently into a plurality of index positions to bring each of said carriages in succession into register with a loading station and subsequently into register with an unloading station at different index positions of the turret, said drive means providing a period of dwell between successive intermittent movements of the turret;

individual radial guide means on said turret for each of said carriages, each carriage when in register with each of said stations being movable along its radial guide means towards and away from said axis;

arcuate guide means on said frame concentric with said axis between said loading and unloading stations;

arcuate track means of said carriages engaged with said arcuate guide means during movement of the carriages between the loading and unloading stations, said carriages being disengaged from said arcuate guide means when in register with the loading or unloading stations;

coupling members mounted on said frame at the loading and unloading stations for radial movement relative to said axis, said coupling members being adapted to engage and entrain the carriages in register with said stations for movement therewith;

carriage drive means operable in synchronism with the turret drive means to move the coupling members and the carriages entrained therewith from a radially inner position to a radially outer position and back to the radially inner position during said dwell period; and gripper means on each carriage operable to grip an article at the loading station when the carriage is in its radially outer position at the loading station, and to release the article at the unloading station when the carriage is in its radially outer position at the unloading station.

2. A machine as claimed in claim 1, wherein each coupling member is formed with an arcuate guide aligned with said arcuate guide means on the frame when the coupling member is in said radially inner position, the arcuate guides on the coupling members being engaged with said track means on the carriages in register with the loading and unloading stations to thereby entrain the carriages to the coupling members for unison radial movement.

3. A machine as claimed in claim 2, wherein said arcuate guide means comprise arcuate ribs formed on the top surface of the frame and lying in a circle concentric with said axis, and said track means comprise arcuate grooves in the underside of the carriages.

4. A machine as claimed in claim 3, wherein said arcuate guides on the coupling members comprise arcuate tongues engagable in the grooves in the underside of the coupling members.

5. A machine as claimed in claim 1, wherein said radial guide means for each carriage comprises a rod fixed to the turret, the carriage having a bore for reception of the rod, and the gripper means on the carriage are operable by vacuum, wherein the center of said bore is enlarged to form an annular chamber between the carriage and the guide rod, seals are provided at the ends of the bore to prevent entry of air through the bore into said chamber, the carriage is formed with a duct connecting the gripper means to the annular chamber, and the guide rod has a duct connected by a port therein to the annular chamber, said ducts and annular chamber forming a passageway for applying vacuum to the gripper means during radial movement of the carriage between its radially inner and radially outer positions.

6. A machine as claimed in claim 1, wherein said carriage drive means comprises:

a cam disc rotatably mounted on the frame below said turret;

a cam track located on said disc;

whereby said cam disc turns through one revolution during the period between the completion of successive index movements of the turret;

the cam track being arranged to move the coupling member from said radially inner position to said radially outer position and back to the radially inner position in each revolution of the cam disc; and a follower mounted on one of said coupling members and engaged in said cam track; and means for rotating the cam disc at constant speed in synchronism with angular movement of the turret.

7. A machine as claimed in claim 6, wherein the carriages are spaced at equal angular intervals around the turret, the number of index positions of the turret in each revolution is equal to the number of carriages whereby in each index position of the turret, one carriage is in register with the loading station and another carriage is in register with the unloading station, the loading and unloading stations are at diametrically opposite sides of the turret, and the two coupling members are interconnected by a rack and pinion mechanism comprising a pinion rotatably mounted to the frame about said axis, and two toothed racks connected one to each of said coupling members and meshing with opposite sides of said pinion.

* * * * *